UNITED STATES PATENT OFFICE.

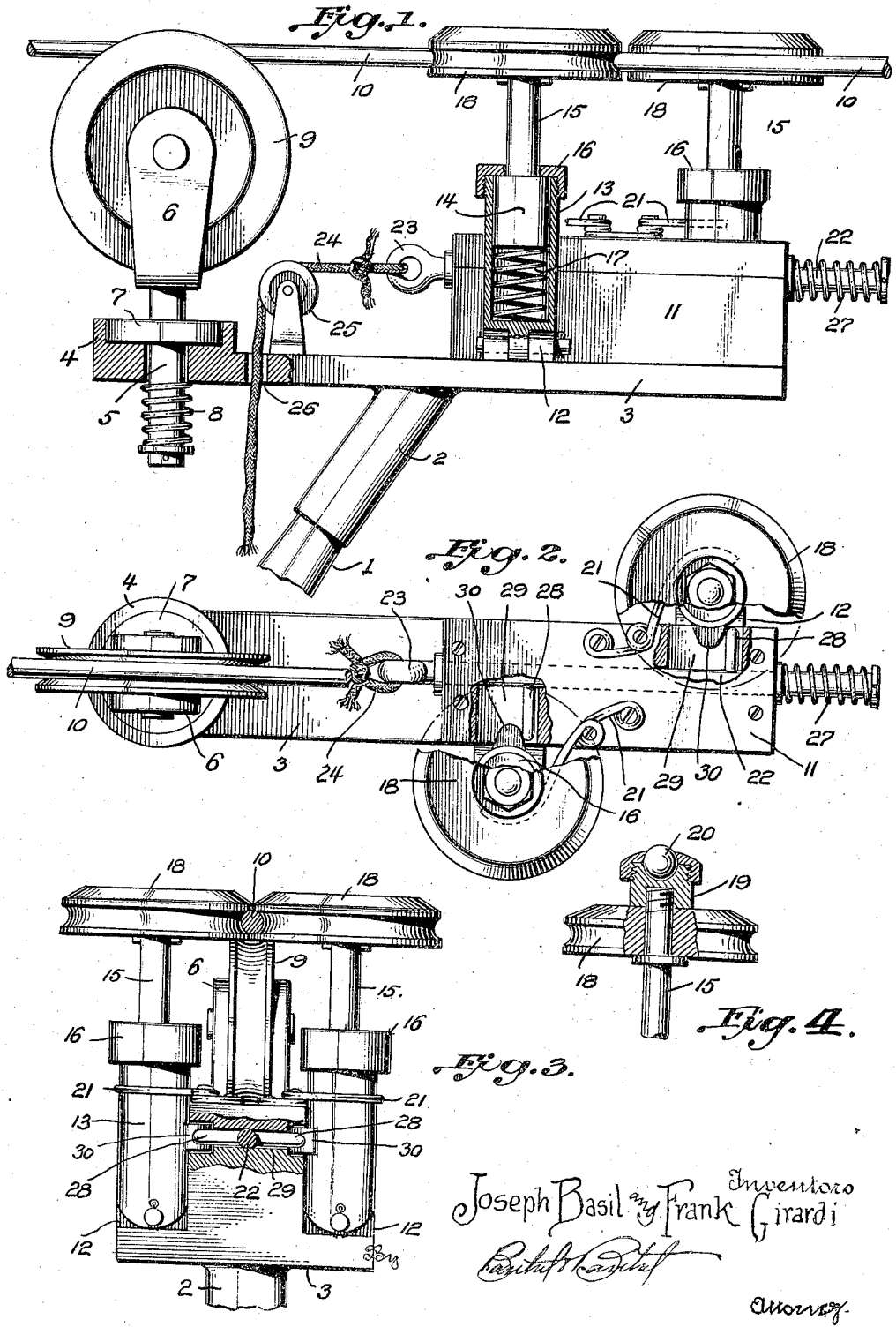

JOSEPH BASIL AND FRANK GIRARDI, OF DETROIT, MICHIGAN.

TROLLEY-HARP.

1,306,298. Specification of Letters Patent. Patented June 10, 1919.

Application filed January 2, 1919. Serial No. 269,213.

*To all whom it may concern:*

Be it known that we, JOSEPH BASIL and FRANK GIRARDI, citizens of the United States of America, residing at Detroit, in the county of Wayne and State of Michigan, have invented certain new and useful Improvements in Trolley-Harps, of which the following is a specification, reference being had therein to the accompanying drawings.

This invention relates to a trolley harp and our invention aims to provide a harp that may be readily mounted on an ordinary trolley pole, in lieu of the present type of trolley harp, and eliminate as near as possible the trouble now experienced by trolley wheels leaving the trolley wires or conductors, particularly when encountering irregular sections of trolley wire, traveling at high speed and encountering switches, guard boards, and the like.

Our improved trolley harp includes auxiliary wheels coöperating with a main wheel in establishing a running connection between the trolley harp and its wire, said auxiliary wheels being constructed so as to yield when wire hangers are encountered and also yield to permit of the trolley harp being lowered.

The novel construction entering into the harp will be hereinafter considered and then claimed, and reference will now be had to the drawings, wherein—

Figure 1 is a side elevation of the trolley harp, partly broken away and partly in section;

Fig. 2 is a plan of the harp, partly broken away and partly in section;

Fig. 3 is an end view of the harp partly broken away and partly in section; and

Fig. 4 is a detail sectional view of one of the auxiliary trolley wheels provided with an anti-frictional device.

In the drawing, the reference numeral 1 denotes a portion of the trolley pole, and mounted on the upper end thereof is a socket 2 supporting a harp plate 3. At the forward end of said harp plate is a bearing 4 for the spindle 5 of a main harp 6, said spindle having a head 7 rotatable in the bearing 4. The spindle 5 extends through the bearing and has the lower end thereof provided with a coiled spring 8 and this spring permits vertical movement of the head 7 in the bearing 4 but prevents said head from becoming accidentally displaced.

Journaled in the main harp 6 is a main trolley wheel 9 adapted to revolve against the trolley wire 10, said wheel and wire being of the ordinary and well known type.

On the rear end of the harp plate 3 is a two part block 11, and at the sides of said block are sets of apertured ears 12, one set being disposed in advance of the other. Pivotally mounted between the apertured ears 12 are the lower ends of cylinders 13 and slidable in said cylinders are the heads 14 of plungers 15 said plungers extending through caps 16 screwed on the upper ends of said cylinders. In the cylinders are coiled expansion springs 17, the expansive force of said springs maintaining the plungers 15 normally elevated.

Rotatable on the upper ends of the plungers 15 are horizontally disposed trolley wheels 18 engaging opposite sides of the wire 10, and these auxiliary trolley wheels are adapted to coöperate with the main wheel 9 in retaining the trolley harp in operative relation to the wire 10. In some instances the auxiliary wheels 18 may have hub portions 19 provided with antifrictional bearings 20, preferably in the form of balls that will engage a guard or bridge board when the harp passes therebeneath and assist in preventing the harp from being displaced.

Engaging the cylinders 13 are the curved outer ends of springs 21 mounted on the block 11 and these springs are adapted to maintain the cylinders 13 normally in a vertical position against the side walls of the block 11.

Slidable in the block 11 between the parts thereof, is a rod 22 which has the forward end thereof terminating in an eye 23 connected to a cable 24 said cable extending over a sheave 25 on the plate 3 and through an opening 26 provided therefor in said plate. The cable 24 constitutes a trolley rope and permits of the conductor or operator of a car lowering the trolley harp.

On the rear end of the rod 22 is a coiled retractile spring 27 and intermediate the ends of said rod are side arms 28, said arms extending into slots 29 in the side walls of the block 11. The arms 28 engage inwardly projecting beveled lugs 30 on the cylinders 3 and when the cable 24 is pulled upon to remove the harp relative to the wiring, the arms 28 of said rod force or kick the lugs 30 outwardly, thereby shifting the cylinders 13 away from the block 11 and sufficiently separating the auxiliary trolley wheels 18 to permit of the trolley harp being lowered.

The upper beveled edges of the auxiliary wheels 18 will permit of the harp being snapped into engagement with the wire 10, but when the pole 1 is manipulated through the medium of the cable 24, the arms 28 of the rod 22 will maintain the wheels 18 in an open position until the main trolley wheel 9 is on a wire, then by releasing the cable 24, the spring 27 restores the rod 22 to normal position allowing the cylinders 13 to engage the sides of the block 11 and position the auxiliary trolley wheels 18 on the wire 10.

It is thought that the operation and utility of the trolley harp will be apparent without further description, and while in the drawing there are illustrated the preferred embodiments of our invention, it is to be understood that the structural elements are susceptible to such variations and modifications as fall within the scope of the appended claims.

What we claim is:—

1. A trolley harp comprising a plate, a main trolley wheel at the forward end thereof, a block on the rear end of said plate, cylinders pivoted at the sides of said block, spring pressed plungers in said cylinders, and extending out of said cylinders into a plane above said block, horizontally disposed auxiliary trolley wheels on the upper ends of said plungers, means carried by said block maintaining said cylinders against said block, and means movable longitudinally of said block adapted for shifting said cylinders out of engagement with said block.

2. A trolley harp comprising a plate, a main trolley wheel on the forward end thereof, a block on the rear end of the plate, cylinders pivoted on said plate at the sides of said block, rotatable horizontally disposed auxiliary trolley wheels supported above said cylinders, means on said block engaging said cylinders to maintain said cylinders normally against said block, and means shiftable longitudinally in said block adapted when shifted to force said cylinders outwardly from said block.

3. A trolley harp comprising a plate, a main trolley wheel on the forward end thereof, a block on the rear end of said harp plate, pivoted vertically disposed cylinders carried by said harp plate at the sides of said block, spring pressed plungers in said cylinders and extending out of the cylinders, auxiliary trolley wheels supported by the upper ends of said plungers, a rod slidable in said block, a cable attached to said rod for moving said rod in one direction, a spring on said rod adapted to shift said rod in an opposite direction, and means carried by said rod and adapted to shift said cylinders outwardly from said block to separate said auxiliary trolley wheels.

4. A trolley harp comprising a plate, a main trolley wheel at the forward end of said plate, a block on the rear end of said plate, cylinders pivoted on said plate at the sides of said block auxiliary trolley wheels supported from said cylinders, a rod shiftable in said block, arms carried by said rod, lugs on said cylinders extending into said block and engaged by said arms, and means connected to said rod adapted for shifting said rod and causing said cylinders to separate the auxiliary trolley wheels supported thereby.

In testimony whereof we affix our signatures in presence of two witnesses.

JOSEPH BASIL,
FRANK GIRARDI.

Witnesses:
KARL H. BUTLER,
ANNA M. DORR.

Copies of this patent may be obtained for five cents each, by addressing the "Commissioner of Patents, Washington, D. C."